United States Patent [19]

Acker

[11] 4,453,111
[45] Jun. 5, 1984

[54] ELECTRIC DRIVE FOR SUBMARINES

[75] Inventor: Frank E. Acker, Forest Hills, Pa.

[73] Assignee: Westinghouse Electric Corp., Pittsburgh, Pa.

[21] Appl. No.: 367,142

[22] Filed: Apr. 9, 1982

[51] Int. Cl.³ .............................................. H02P 1/52
[52] U.S. Cl. ................................. 318/111; 318/101; 318/75; 318/66
[58] Field of Search ............... 318/49, 50, 54-61, 318/63-66, 82-83, 86-87, 90, 92, 93, 94, 95, 96, 101, 104, 111, 112, 113

[56] References Cited

U.S. PATENT DOCUMENTS

| 1,342,797 | 6/1920 | Conti . | |
|---|---|---|---|
| 1,860,523 | 5/1932 | Austin et al. . | |
| 2,658,174 | 11/1953 | Warrick . | |
| 2,970,250 | 1/1961 | Hibbard . | |
| 3,231,803 | 1/1966 | Pryor et al. . | |
| 3,369,162 | 2/1968 | Torii . | |
| 3,638,718 | 2/1972 | Ilig . | |
| 3,757,186 | 9/1973 | Ozawa | 318/349 |
| 3,764,867 | 10/1973 | Smith . | |
| 3,800,197 | 3/1974 | Mehta | 318/111 |
| 3,803,465 | 4/1974 | Akamatsu . | |
| 3,851,232 | 11/1974 | Chirgwin . | |
| 3,938,013 | 2/1976 | Seilly et al. | 318/111 |
| 4,066,933 | 1/1978 | Pham et al. | 318/60 |

Primary Examiner—B. Dobeck
Assistant Examiner—Arthur G. Evans
Attorney, Agent, or Firm—R. P. Lenart

[57] ABSTRACT

A direct current electric motor marine propulsion system is provided with a pair of shunt wound direct current electric motors which are alternatively connected in a series/parallel circuit configuration. A forward biased diode between the motors in the series circuit, provides for smooth switching characteristics. Fine control of low speed operation is accomplished through the use of a chopper in series with the power source. A contactor connected across the diode provides for reverse current flow during regenerative braking.

7 Claims, 1 Drawing Figure

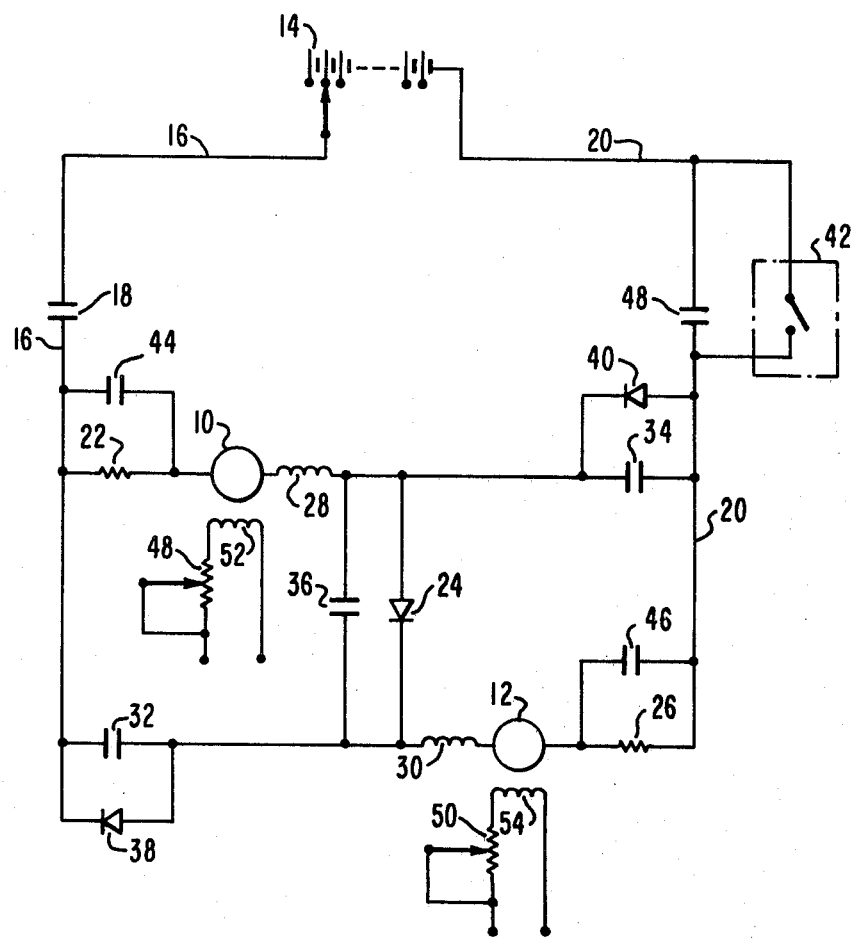

ELECTRIC DRIVE FOR SUBMARINES

BACKGROUND AND SUMMARY OF THE INVENTION

This invention relates to electric propulsion systems and more particularly to such systems for use in submarines.

Electric submarine drive systems must operate at high efficiency while maintaining smooth acceleration and including means for braking. These requirements are met by a system which alternatively connects a plurality of electric motors in a series or parallel configuration. Vehicle propulsion systems utilizing series/parallel motor circuits are well known. Examples of such systems can be found in U.S. Pat. No. 3,369,162, issued Feb. 13, 1968, to Yasunosuke Torii; U.S. Pat. No. 3,764,867, issued Oct. 9, 1973 to Smith; and U.S. Pat. No. 3,800,197, issued Mar. 26, 1974 to Mehta.

A particular vehicle propulsion system used on mine shuttle cars utilizes a series/parallel motor arrangement and includes a branch circuit comprising the series connection of two series wound d.c. motors connected between two power supply conductors. A diode is provided between the motors, one contactor is connected between the anode of the diode and one power conductor while a second contactor is connected between the cathode of the diode and the other power conductor. Closure of these contactors switches the motors from series to parallel operation. This system provides some control over the motor acceleration but is not designed for accurate speed control.

U.S. Pat. No. 1,342,797, issued June 8, 1920 to Conti discloses an early marine propulsion system which utilizes a series/parallel motor arrangement. In that system, two shunt wound d.c. motors are connected in series between two power supply conductors. A first contactor is connected in series between the motors and a second contactor is connected between one side of the first contactor and one power supply conductor while a third contactor is connected between the other side of the first contactor and the other power supply conductor. For series operation, the first contactor is closed while the second and third contactors are open. To switch to parallel operation, the first contactor must be opened and a certain period of time must pass to ensure that current through the first contactor has ceased before the second and third contactor can be closed. During this time interval, the motors slow down and may have to be reaccelerated to their previous series operation speed. In addition, some type of mechanical interlock may be used to ensure proper contactor sequencing. This increases system complexity and decreases reliability.

The use of direct current shunt wound electric motors in a series/parallel arrangement provides for a wider range of controllable speeds than a single motor propulsion circuit and produces a more desirable family of speed torque curves for propeller-type loads than a series/parallel arrangement of series wound direct current motors. For electric battery powered submarine applications, it is desirable that the propulsion system include regenerative braking. In addition, it must have provisions for low speed maneuvering and include means for reducing electromagnetic interference.

An electric motor marine propulsion system constructed in accordance with the present invention includes at least two direct current shunt wound electric motors and means for alternatively connecting the motors in series/parallel configurations. A diode is connected between the motors to provide for a smooth transition from series to parallel operation. Means for shorting this diode is included to allow regenerative braking. Additional motor speed control is provided by adjusting field current in the motor shunt windings and/or regulating voltage or current delivered to the circuit.

BRIEF DESCRIPTION OF THE DRAWING

The single FIGURE is a schematic diagram of a direct current electric motor submarine propulsion system constructed in accordance with one embodiment of the present invention.

DETAILED DESCRIPTION OF THE PREFERRED EMBODIMENT

Referring to the drawing, a schematic diagram of a direct current electric motor submarine propulsion system in accordance with the present invention is illustrated. In this embodiment, shunt-wound direct-current motors 10 and 12 are alternatively connected in series or parallel across direct current power supply 14. A positive conductor 16 is connected through contactor 18 to a positive terminal of direct current power supply 14, which in this embodiment is shown as a multiple tap battery. Negative conductor 20 is connected to the negative terminal of direct current power supply 14. A branch circuit including starting resistor 22, DC motor 10, diode 24, DC motor 12 and starting resistor 26 is connected between positive conductor 16 and negative conductor 20. Inductors 28 and 30 represent motor inductance and/or auxiliary inductance associated with electric motors 10 and 12, respectively.

Contactor 32, connected between the cathode of diode 24 and positive conductor 16, and contactor 34, connected between the anode of diode 24 and negative conductor 20, serve as means for connecting motors 10 and 12 in parallel across positive conductor 16 and negative conductor 20. Contactor 36 connected across the anode and cathode of diode 24, provides means for reverse current flow through direct current power supply 14 during regenerative braking. Diodes 38 and 40, which are normally reversed biased and connected across contactors 32 and 34 respectively, serve to reduce electromagnetic interference generated by the system during switching and during low speed maneuvering.

For low speed maneuvering, chopper 42 acts as means for interrupting current flow in positive and negative conductors 16 and 20. For high speed operation, contactors 44 and 46 are closed, thereby shorting starting resistors 22 and 26, respectively. In addition, contactor 48 is closed, thereby shorting chopper 42. Vernier speed adjustment is accomplished by varying rheostats 48 and 50, thereby varying current through shunt field windings 52 and 54, respectively.

When the propulsion system is at rest, all contactors are open. To accelerate from rest to a high speed, a tap on battery 14 is selected and contactors 18 and 48 are closed. At this point, motors 10 and 12 are connected in series and propulsion battery 14 drives current through starting resistor 22, motor 10, forward biased diode 24, motor 12 and starting resistor 26. As the submarine accelerates, contactors 32 and 34 close, connecting the resistor motor branch circuits in parallel. For further acceleration, contactors 44 and 46 close, shorting out starting resistors 22 and 26 and bringing the submarine close to desired operating speed. Fine speed adjustments are made by varying rheostats 48 and 50, thereby varying current through field windings 52 and 54. These field windings may receive power from power source 14 or they may be separately excited.

For low operating speeds, contactors 18, 44 and 46 would be closed, leaving the motors in a series connection. In addition, contactor 48 would be opened thereby inserting chopper 42 in the circuit to provide a fine means of low-speed motor control. The chopper acts as a switch successively interrupting current through negative conductor 20 and its use would be limited to low speed maneuvering. Diodes 24, 38 and 40 function as free-wheeling diodes to minimize electromagnetic interference and to permit motor current flow when the chopper interrupts the power supply current.

Submarines are required to perform a crashback maneuver in which the drive system must act as a brake to slow the propeller shaft before the motors are reversed. In the system shown in the drawing, crashback is initiated from parallel motor high speed operation by opening contactors 32, 34, 44 and 46 and then closing contactor 36 which provides means for reverse current flow. Then the series connected motors act as generators to drive a charging current into propulsion battery 14. As the submarine propeller slows, contactors 18 and 48 are opened and contactors 32 and 34 are closed. The starting resistors 22 and 26 function as dynamic braking resistors. If desired, further braking can be applied by closing contactors 44 and 46 before reversing the field polarity in field coils 52 and 54 and beginning the acceleration sequence with reverse rotation.

The system illustrated in the drawing is efficient at operating speed since no power wasting control elements are in the motor armature circuits. The series/parallel connections give good speed control by effectively doubling the number of battery taps. Diode 24 provides a smooth transfer from series to parallel operation while accelerating by eliminating the need to temporarily stop current flow during the switching operation. A requirement to stop current flow is particularly detrimental in a marine propulsion system because the propeller slows very rapidly if the current is interrupted. Fine speed adjustments are accomplished by selecting an appropriate battery tap, adjusting current through field windings 52 and 54 and/or controlling current through the use of chopper 42. If a failure occurs in one of the motor branch circuits, the remaining motor can be operated in the maneuvering mode to take home the disabled submarine. The combination of inherent take-home capability, highly efficient power drive, wide ranging speed control and smooth acceleration characteristics in addition to dynamic and regenerative braking capability results in an electrical propulsion system which is ideally suited for submarine use.

What is claimed is:

1. An electric motor marine propulsion system which is energized by a direct current power source, said propulsion system comprising:
   a positive conductor connected to one terminal of said direct current power source;
   a negative conductor connected to a second terminal of said direct current power source;
   a branch circuit connected between said positive and negative conductors;
   said branch circuit comprising the series connection of a first shunt wound direct current electric motor, a first diode and a second shunt wound direct current electric motor, wherein said first diode is connected between said first and second electric motors;
   a first pair of contacts connected between the cathode of said first diode and said positive conductor for shorting said cathode to said positive conductor;
   a second pair of contacts connected between the anode of said first diode and said negative conductor for shorting said anode to said negative conductor;
   a chopper for regulating current flow in said positive and negative conductors;
   a second diode connected across said first pair of contacts and being reverse biased;
   a third diode connected across said second pair of contacts and being reverse biased;
   a first starting resistor connected in series with said first motor;
   a second starting resistor connected in series with said second motor;
   means for shorting said first resistor; and
   means for shorting said second resistor.

2. A marine propulsion system as recited in claim 1, further comprising:
   a third pair of contacts across said chopper, for shorting said chopper.

3. A marine propulsion system as recited in claim 1, further comprising:
   a second diode connected between said positive conductor and the cathode of said first diode and being reverse biased; and
   a third diode connected between said negative conductor and the anode of said first diode and being reverse biased.

4. A marine propulsion system as recited in claim 1, further comprising:
   means for allowing reverse current flow during regenerative braking.

5. A marine propulsion system as recited in claim 4 wherein said means for allowing reverse current flow is a third pair of contacts connected between the anode and the cathode of said first diode.

6. A marine propulsion system as recited in claim 1, further comprising:
   means for controlling current in the shunt field windings of said first and second motors.

7. A marine propulsion system as recited in claim 1, wherein said direct current power source is a battery having multiple taps, said positive and negative conductors being connected to two of said taps.

* * * * *